Aug. 9, 1932.  O. TORSETH  1,871,096
APPARATUS FOR EXTINGUISHING FOREST FIRES
Filed June 24, 1929   2 Sheets-Sheet 1
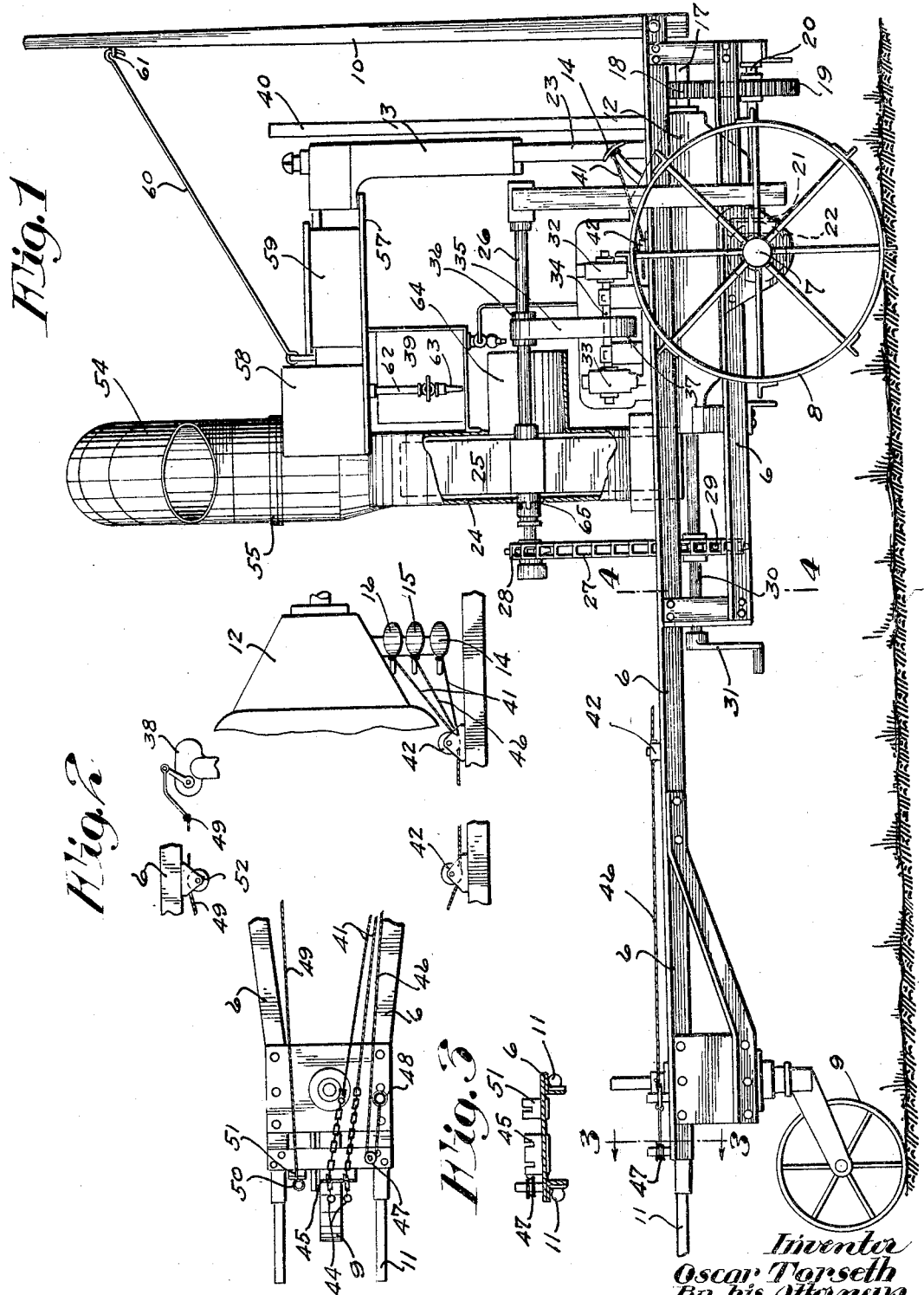
Inventor
Oscar Torseth
By his Attorneys
Merchant & Kilgor

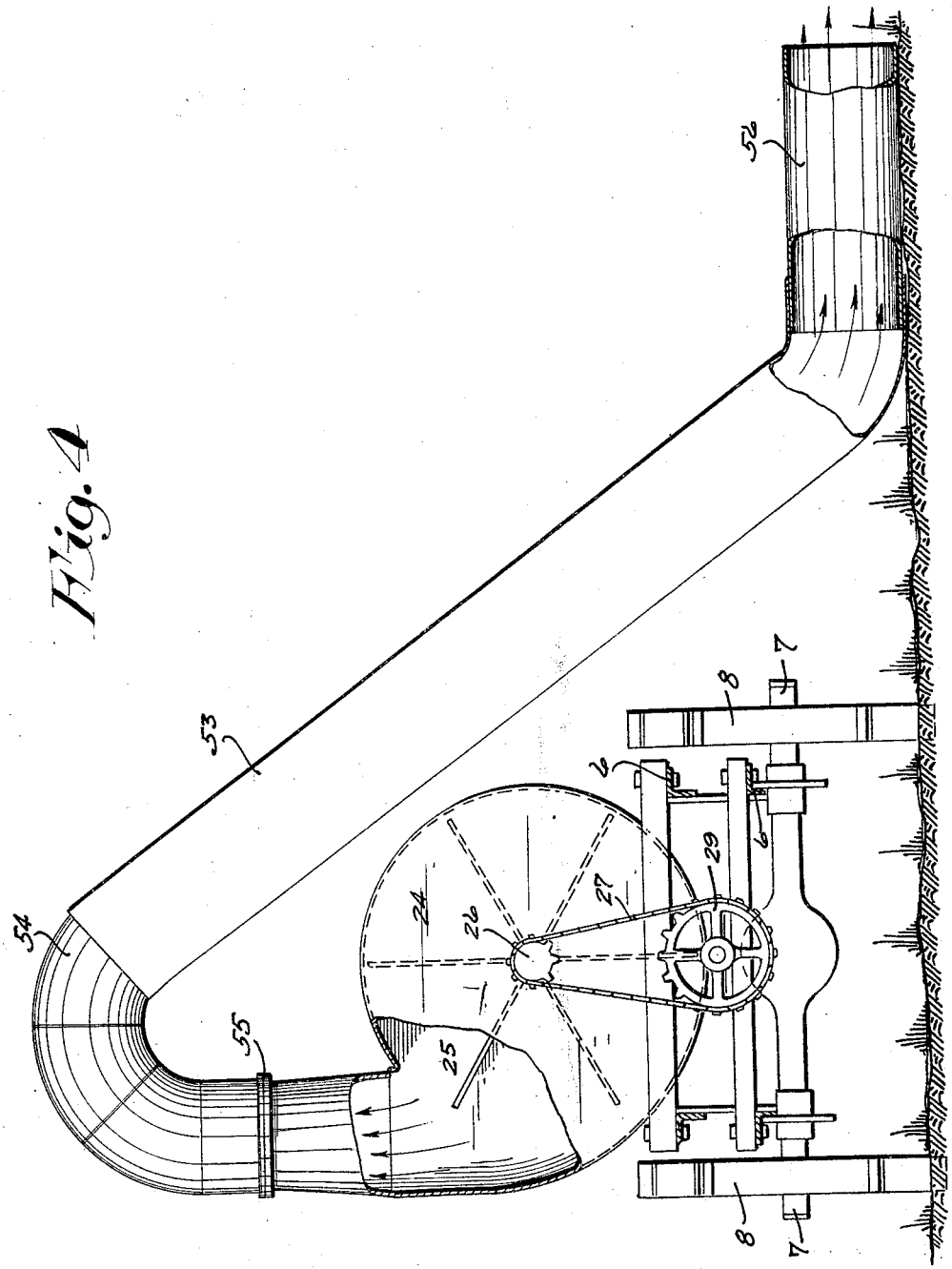

Patented Aug. 9, 1932

1,871,096

UNITED STATES PATENT OFFICE

OSCAR TORSETH, OF COEUR D'ALENE, IDAHO

APPARATUS FOR EXTINGUISHING FOREST FIRES

Application filed June 24, 1929. Serial No. 373,353.

My present invention has for its object to provide a highly efficient apparatus for extinguishing forest fires by blowing the same out without the use of water or by the use of small quantities of water delivered into the apparatus and commingled with the blast of air discharged therefrom. Said invention also provides an apparatus that is small, of lightweight, easy to handle and that is narrow so that it can travel through the woods between trees, stumps, stones and other obstructions and follow narrow and winding trails. In the use of the apparatus the blaze is first blown out and then the embers are scraped loose by men and blown into the burnt area by the use of the apparatus.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a right side elevation of the fire extinguishing apparatus with some parts broken away and sectioned and other parts removed;

Fig. 2 is a fragmentary plan view of the connections for operating the engine;

Fig. 3 is a detail view of the lock plate for certain of the operating connections sectioned on the line 3—3 of Fig. 1; and Fig. 4 is a view partly in rear end elevation with some parts broken away and sectioned and with other parts sectioned on the line 4—4 of Fig. 1.

The apparatus includes a relatively narrow truck comprising a frame 6, a front axel 7 journaled on said frame, a pair of traction wheels 8 keyed to said axel and a caster wheel 9 supporting the rear end of said frame. A braced pole 10 is pivoted to the front end of the frame 6 for vertical swinging movement but held against lateral movement in respect thereto. On the rear end of the frame 6 is a pair of laterally spaced rearwardly projecting handles 11 by which the truck may be steered during its forward travel.

Mounted on the frame 6 over the front axel 7 is an internal combustion engine of the Ford T-type model indicated as an entirety by the numeral 12 with the exception of the radiator 13, clutch and forward speed foot pedal 14, reverse speed foot pedal 15 and the brake foot pedal 16. The following connections are provided for driving the axel 7 and hence the traction wheels 8 from the crank shaft of the engine 12, to wit:

A stub shaft 17 connected to the engine crank shaft by the transmission mechanism, not shown, has keyed thereto a spur pinion 18 which meshes with a spur gear 19 keyed to a countershaft 20 that extends parallel to the engine crank shaft and radially forward from the axel 7. On the rear end of the countershaft 20 is a miter gear 21 that meshes with a miter gear 22 on the front axel 7. A bracket 23 supports the radiator 13 materially above the frame 6 and forward of the front axel 7. Mounted on the frame 6 rearward of the engine 12 is a blower comprising a housing 24 in which is mounted a fan 25, the shaft 26 of which extends longitudinally of the frame 6 parallel to the engine crank shaft and journaled in bearings on the frame 6 and housing 24. This fan 25 is driven from the engine crank shaft by a sprocket chain 27 which runs over a sprocket wheel 28 on the shaft 26 and a sprocket wheel 29 loose on a rear extension 30 of the engine crank shaft. A hand-crank 31 applied to the crank shaft extension 30 is provided for starting the engine.

Referring again to the engine 12 the same further includes a water pump 32, an oil pump 33 mounted on the shaft 34 and driven from the fan shaft 26 by a belt 35 which runs over a relatively small pulley 36 on the shaft 26 and a relatively large pulley 37 on the shaft 34. By thus driving the water and oil circulating pumps the same are in operation when the apparatus is standing still and the engine is operating the fan 25. The carburetor for the engine 12, the gas supply tank and exhaust pipe are indicated by the numerals 38, 39 and 40, respectively. It will be noted that the exhaust pipe 40 extends upright in front of the radiator 13 with its discharge end thereabove.

The foot pedals 14, 15 and 16 are independently operated by cables which run over front and rear guide sheaves 42 on the frame 6. Short chains 43 are attached to the outer ends of the two cables 41 for the foot pedals 14 and 16 and are provided with hand rings 44 by which said cables may be pulled to operate said foot pedals. Co-operating with the chains 42 is a lock plate 45 on the rear end of the frame 6, between the handles 11 and provided with notches into which certain of the links of said chains may be inserted to hold the foot pedal 14 in low speed and the foot pedal 16 with the foot brake set. The cable 41 for the reverse speed foot pedal 15 extends over a guide sheave 47 on the frame 6, that is closely positioned to the lock plate 45, and provided on its outer end with a hand ring 48. This cable 46 must be constantly pulled by means of the hand ring 48 to hold the foot pedal 15 for reverse speed. If found necessary a lock plate similar to the lock plate 45 may be provided for the cable 46.

The throttle valve for the carburetor 38 is operated by a rod 49 having on its outer end a hand ring 50 and which cable at said ring is held by a notched plate 51 attached to the frame 6 close to the lock plate 45. The rod 49, for operating the throttle valve, runs over a guide sheave 52 on the frame 6. Obviously the connections for operating the engine and setting the brakes are so arranged that they are within easy reach of the operator steering the apparatus by means of the handles 11.

When the apparatus is traveling in reverse and steered by the pole 10 the operating connections 41, 46 and 49 are extended to the front of the apparatus so that the operator steering by means of said pole may control the engine and brakes. It may be here stated that the foot pedal 14 will be locked by any suitable means, not shown, so that the engine may be operated only at slow speed.

Leading from the lower housing 24 is a collapsible hose 53, of canvas or other suitable material, the inner end of which attached to a spout 54 in the form of an elbow swiveled at 55 to the discharge stroke of said housing and arranged to permit horizontal swinging movement of the elbow 54 about a vertical axis so that the hose 53 may be carried from the apparatus in any direction. A nozzle 56 is attached to the outer end of the hose 53 and, as shown, is in the form of a metallic spout of substantially the same diameter as the hose 53 and adapted to be supported longitudinally on the ground so that the same may be positioned in any desired direction, see Fig. 4. When the hose 53 is not in use, the same may be folded into a compact space and stored on the apparatus.

Supported from the radiator 13 and housing 24 is a shelf 57 on which is mounted a water supply tank 58 and a tool box or other receptacle 59. A long hook 60 attached to a support on the shelf 57 is arranged to interlock with an eye 61 on the pole 10 and hold said pole in an upright or inoperative position, as shown in Fig. 1. Leading from the water tank 58 at the bottom thereof is a depending pipe 62 having on its lower end a valve-equipped nozzle 63 arranged to discharge water into a segmental apron 64 on the housing 24 and leading into the eye thereof. Water discharged from the nozzle 63 is drawn into the housing 24 through the eye thereof by the air intake produced by the fan 25 and commingled with the air discharged from the nozzle 56.

Again referring to the fan 25 the same is connected to its shaft 26 by a clutch 65 so that said fan may be stopped without interrupting the action of the pumps 32 and 33.

The above described apparatus is relatively small, narrow, of light-weight, and by mounting the same on a pair of front traction wheels 8 and a rear caster wheel 9 it may be easily steered between trees, stumps, and along norrow winding trails. Ordinarily, the operator walks behind the apparatus and steers the same by means of the handles 11. The controls for the engine and brakes are within easy reach of the operator when in this position. The mounting of the engine and blower, in respect to the traction wheel 8, is such that there is very little weight on the caster wheel 6, thus making the apparatus easy to steer. This arrangement of the load on the traction wheels 8 serves another important function in that it prevents the front end of the apparatus from lifting, when pulling hard. When backing up the apparatus if the rear or caster wheel, equipped end thereof tends to lift, the operator by means of the handles 11 may easily hold the caster wheel 9 on the ground. The advantage of securing the traction wheels 8 to the shaft 7 for common rotation therewith is to prevent one wheel from stopping while the other is slipping.

In place of this simple arrangement a differential of the interlocking type may be used. When the apparatus is traveling down hills, the rear end thereof will tend to lift but as the apparatus is light, the operator can easily hold the same down by means of the handles 11. In mountainous country where the ground is so steep that the operator can hardly secure a footing and is thus unable to hold the rear end of the apparatus down, said apparatus may be operated in reverse, so that the caster wheel 9 is at the front thereof, and guided by means of the pole 10, and at which time the operating connections for the engine and brakes will be extended to the front end of the apparatus as previously described.

The purpose of mounting the radiator 13 in front of the eye of the housing 24 is to draw sufficient air through the radiator 13 during the operation of the blower while the apparatus is standing still. When fighting a fire the apparatus works at the edge thereof, runs a short distance, stops to blow, etc. During the driving of the traction wheels 8 by the engine said engine does not operate at full speed but when the apparatus is standing still the engine is operated at full speed for propelling the fan 25.

What I claim is:

1. An apparatus of the class described comprising a portable frame, an internal combustion engine and a blower mounted on the frame, driving connections from the engine to the blower, and a hose leading from the blower, the radiator of the engine being in front of the eye of the blower.

2. An apparatus of the class described comprising a portable frame, a motor driven blower on the frame having an upstanding spout, and a hose leading from the spout, said spout being swivelled to the blower, the swivel connection of the spout and the junction of the spout with the hose being at a sufficient elevation to clear any protruding element mounted on the apparatus when turned about the axis of the upstanding spout.

In testimony whereof I affix my signature.

OSCAR TORSETH.